United States Patent
Pan et al.

(10) Patent No.: US 7,553,341 B2
(45) Date of Patent: Jun. 30, 2009

(54) HIGH POWER DENSITY SUPERCAPACITORS WITH CARBON NANOTUBE ELECTRODES

(75) Inventors: Ning Pan, Davis, CA (US); Chunsheng Du, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 287 days.

(21) Appl. No.: 11/281,325

(22) Filed: Nov. 16, 2005

(65) Prior Publication Data

US 2008/0010796 A1 Jan. 17, 2008

Related U.S. Application Data

(60) Provisional application No. 60/630,766, filed on Nov. 24, 2004.

(51) Int. Cl.
*H01G 9/00* (2006.01)
(52) U.S. Cl. ............ 29/25.03; 438/584; 438/754; 438/800; 361/502; 361/508; 257/E21.008
(58) Field of Classification Search .......... None
See application file for complete search history.

(56) References Cited

U.S. PATENT DOCUMENTS

2003/0102222 A1* 6/2003 Zhou et al. .......... 205/109
2003/0180472 A1* 9/2003 Zhou et al. .......... 427/430.1
2004/0038556 A1* 2/2004 French et al. .......... 438/800
2006/0098389 A1* 5/2006 Liu et al. .......... 361/502

OTHER PUBLICATIONS

Publication entitled "Preparation and preliminary property study of carbon nanotubes films by electrophoretic deposition", by Chunsheng Du et al., Materials Letters, Elsevier Science, Mar. 15, 2002, pp. 434-438.
Publication entitled "Preparation of carbon nanotubes composite sheet using electrophoretic deposition process", by Chunsheng Du et al., Journal of Materials Science Letters 21, Kluwer Academic Publishers, 2002, pp. 565-568.

* cited by examiner

*Primary Examiner*—N Drew Richards
*Assistant Examiner*—Kyoung Lee
(74) *Attorney, Agent, or Firm*—Park, Vaughan & Fleming LLP (57) ABSTRACT

One embodiment of the present invention provides a process for fabricating an electrode for a capacitor using carbon nanotubes (CNTs), wherein the electrode comprises a metal substrate and a layer of active material (CNTs) coated onto the metal substrate. Specifically, the process starts by dispersing CNTs in a solvent to form a suspension. Next, the CNTs are charged in the suspension. The metal substrate is then immersed in the suspension. Next, the CNTs are deposited onto the metal substrate using electrophoretic deposition (EPD) to form the layer of active material on the metal substrate. In particular, the layer of active material is formed on the metal substrate without using a binder, which effectively reduces contact resistance between the active material and the metal substrate.

25 Claims, 8 Drawing Sheets

HIGH POWER DENSITY SUPERCAPACITORS WITH CARBON NANOTUBE ELECTRODES

RELATED APPLICATION

This application hereby claims priority under 35 U.S.C. §119 to U.S. Provisional Patent Application No. 60/630,766, filed on 24 Nov. 2004, entitled "High Power Density Supercapacitors Using Electrodes of Coherent Carbon Nanotube Thin Films and Method for Manufacturing the Same," by inventors Ning Pan and Chunsheng Du.

BACKGROUND

1. Field of the Invention

The present invention relates to energy storage devices. More specifically, the present invention relates to supercapacitors comprising carbon nanotube electrodes.

2. Related Art

Rapid advances in nanoscience and nanotechnology have led to the ground-breaking discovery of carbon nanotubes. Carbon nanotubes are a new form of carbon-based material and exhibit many unique properties, such as extraordinary strength, and excellent electrical and heat conductivity, thereby making them ideal candidates for many important applications.

In particular, carbon nanotubes are attractive electrode materials for fabricating electrochemical energy storage devices because of their high electrical conductivity, chemical stability, low mass density and large accessible surface area. Consequently, a wide range of potential applications for electrochemical energy storage systems based on carbon nanotubes have been proposed recently. For example, carbon nanotubes have been formed into electrodes for Lithium-Ion secondary batteries, for hydrogen storage in fuel cells, and for supercapacitors.

As unique energy storage devices, supercapacitors can provide significant amount of energy in a short period of time, i.e., high power density. Practically, the power density of supercapacitors can be many times larger than that of secondary batteries, making them indispensable for surge-power delivery, such as in hybrid-electric and fuel-cell powered vehicles.

Typically, a supercapacitor comprises two electrodes separated by an electrolyte, wherein each electrode further comprises a thin layer of active material (e.g. carbon nanotubes) prepared on a metal substrate (current collector). Theoretically, the maximum power density of a supercapacitor is given by $P_{max}=V_i^2/4R$, where $V_i$ is a initial voltage, and R is an equivalent series resistance (ESR) of the supercapacitor which includes both the internal resistance in the layer of active material and the contact resistance between the layer of active material and the current collector. Accordingly, reducing the ESR is the key to attain high power density.

There have been several successful demonstrations of high power density supercapacitors based on carbon nanotubes. So far, an 8 kW/kg power density and a 20 kW/kg power density have been reported using multi-walled carbon nanotubes and single-walled carbon nanotubes, respectively. Unfortunately, single-walled carbon nanotubes are significantly more expensive than multi-walled carbon nanotubes. Furthermore, use of a binder is often required to hold the carbon nanotubes together in those supercapacitors which typically results in an increased contact resistance between the layer of active material and the current collector. Additionally, those supercapacitors which can achieve 20 kW/kg power density typically require subsequent high temperature treatment (1000° C.) after the carbon nanotube electrodes are constructed.

Hence, what is needed is a method for fabricating a high power density carbon nanotube supercapacitor without the above-described problems.

SUMMARY

One embodiment of the present invention provides a process for fabricating an electrode for a capacitor using carbon nanotubes (CNTs), wherein the electrode comprises a metal substrate and a layer of active material (CNTs) coated onto the metal substrate. Specifically, the process starts by dispersing CNTs in a solvent to form a suspension. Next, the CNTs are charged in the suspension. The metal substrate is then immersed in the suspension. Next, the CNTs are deposited onto the metal substrate using electrophoretic deposition (EPD) to form the layer of active material on the metal substrate. In particular, the layer of active material is formed on the metal substrate without using a binder, which effectively reduces contact resistance between the active material and the metal substrate.

In a variation on this embodiment, the CNTs can include single-walled CNTs (SWNTs) and multi-walled CNTs (MWNTs).

In a variation on this embodiment, the process further involves baking the layer of active material on the metal substrate in a hydrogen ($H_2$) environment after depositing the CNTs onto the metal substrate using the EPD.

In a variation on this embodiment, dispersing the CNTs in the solvent involves sonicating the solvent and the CNT mixture for a predetermined time period.

In a variation on this embodiment, charging the CNTs in the suspension involves adding $Mg(NO_3)_2 \cdot 6H_2O$ into the suspension as electrolyte, which positively charges the CNTs.

In a variation on this embodiment, the metal substrate is coupled to a negative terminal of a constant voltage source.

In a variation on this embodiment, the metal substrate can be placed in the suspension horizontally, vertically, or at an arbitrary angle.

In a variation on this embodiment, during deposition of the CNTs onto the metal substrate using the EPD, the charged CNTs move upward towards the metal substrate under an applied electric field, wherein the metal substrate is placed horizontally in the suspension.

In a variation on this embodiment, the metal substrate can include nickel, copper, aluminum, gold or platinum.

In a variation on this embodiment, the solvent is ethanol.

In a variation on this embodiment, the active material can include: carbon nanotube, carbon black, carbon fiber, active carbon, or a mixture of any of the above.

Another embodiment of the present invention provides a process for fabricating a layer of active material with a high packing-density, wherein the layer of active material is used to form an electrode, wherein the electrode comprises a metal substrate and the layer of active material coated onto the metal substrate. Specifically, the process starts by obtaining functionalized active material. The functionalized active material is then dispersed in a solvent to form a high-concentration colloidal suspension of the active material. Next, the suspension of the active material is directly deposited onto the metal substrate to form the layer of active material. In particular, the layer of active material is formed on the metal substrate with high packing-density without using a binder, which effectively reduces contact resistance between the active material and the metal substrate.

In a variation on this embodiment, obtaining the functionalized active material involves treating the active material in a concentrated acid to bond a plurality of functional groups onto the active material, and then removing the concentrated acid from the treated active material.

In a further variation, removing the concentrated acid from the treated active material involves: washing the active material with distilled water; rinsing the washed active material with ethanol; and drying the active material at a predetermined temperature.

In a variation on this embodiment, the solvent can be dimethylformamide (DMF) or distilled water.

In a variation on this embodiment, dispersing the active material in the solvent involves sonicating the solvent and the active material mixture for a predetermined time period.

In a further variation, the functional groups include: —COOH, >C=O, and —OH.

In a variation on this embodiment, the active material is oxidized prior to being dispersed in the solvent.

Another embodiment of the present invention provides an electrode for an energy storage device, wherein the electrode comprises a metal substrate and a layer of active material coated onto the metal substrate, wherein the active material is carbon nanotube (CNT). Specifically, the layer of active material is coated on the metal substrate by electrophoretic deposition (EPD) without using a binder, which effectively reduces contact resistance between the active material and the metal substrate.

In a variation on this embodiment, the energy storage device can include a capacitor or a battery.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Supercapacitor

Figure 1:
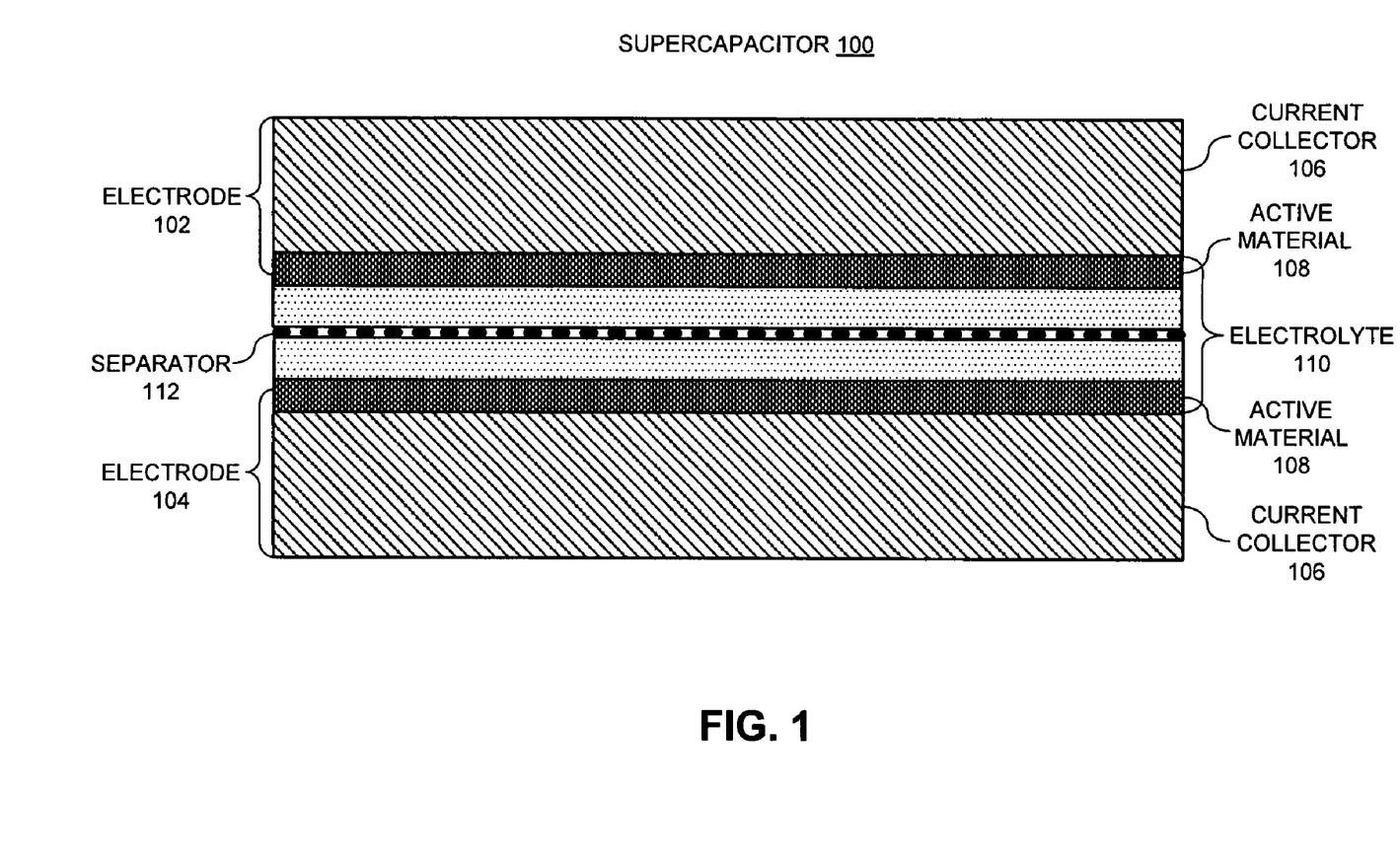
FIG. 1 illustrates a typically supercapacitor structure in accordance with an embodiment of the present invention.

FIG. 1 illustrates a typically supercapacitor structure in accordance with an embodiment of the present invention. Supercapacitor 100 comprises two parallel electrodes 102 and 104. Each of the electrodes further comprises a metal substrate 106, or "current collector" 106, and active material layer 108 which is coated on the inner surface of current collector 106. Current collector 106 and active material layer 108 effectively form an electrode structure, wherein active material layer 108 is typically thinner than the current collector 106. Active material layer 108 is generally comprised of activated-carbon based materials, which have a high surface area per unit volume ratio. In one embodiment of the present invention, the active material is carbon nanotube (CNT), more specifically, multi-walled carbon nanotube (MWNT).

Electrodes 102 and 104 are typically separated by an electrolyte 110 which facilitates conduction between the two electrodes during a charge/discharge operation. Electrolyte 110 in supercapacitor 100 can include KOH, $H_2SO_4$ or $Na_2SO_4$. Note that active material layers 108 are effectively immersed in electrolyte 110. This is important because charged ions can be exchanged between the two electrodes through electrolyte 110.

A solid separator 112 is used to prevent short circuit between the two electrodes as well as to separate electrolyte 110 between the electrodes. Separator 112 typically has porous structure to allow electrolyte 110 to pass through. A separator material used in typical superconductors can include cellulose filter paper and glass fiber filer paper.

Note that, even though supercapacitor 100 is constructed similar to a battery, supercapacitor 100 stores energy in a form of electrostatic charge accumulation at the electrode/electrolyte interface and no electrochemical reaction process is involved.

Fabricating CNT Electrodes by Direct Deposition

Figure 2A:
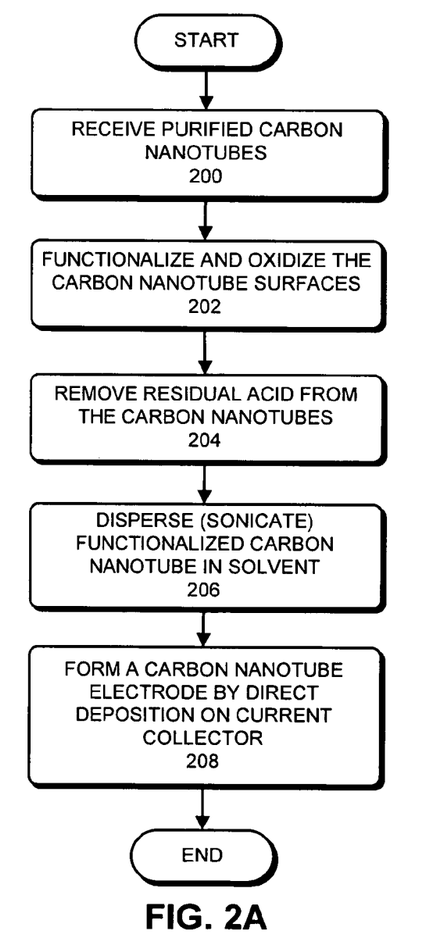
FIG. 2A presents a flowchart illustrating the process of fabricating a thin-layer CNT electrode by direct deposition in accordance with an embodiment of the present invention.

FIG. 2A presents a flowchart illustrating the process of fabricating a thin-layer CNT electrode by direct deposition in accordance with an embodiment of the present invention. The process starts by receiving some purified CNTs (step 200). Note that CNTs used as an active material for supercapacitor electrodes 102 and 104 can include single-walled carbon nanotubes (SWNTs) or multi-walled carbon nanotubes (MWNTs). Generally, SWNTs are significantly more expensive to synthesize than MWNTs.

In one embodiment of the present invention, the CNTs are MWNTs produced from a chemical vapor deposition (CVD) process described below. More specifically, Synthesizing MWNTs by the CVD process is conducted in a horizontal quartz tube in a furnace. Metal catalyst powder ($Fe/Al_2O_3$) for producing MWNTs is placed in a ceramic boat which is then loaded into the tube furnace. Next, hydrogen ($H_2$) gas is introduced into the furnace, which is then heated up to 700° C. The temperature is held for approximately 30 minutes during which a carbon-containing gas (ethylene) is introduced into the quartz tube. Ethylene supply is then shut off and the system is cooled to room temperature. At the end of the CVD process, a $Fe/Al_2O_3$/MWNTs powder mixture is formed.

After the CVD process, a purification process is followed to extract MWNTs from the $Fe/Al_2O_3$/MWNTs powder mixture. In particular, the $Fe/Al_2O_3$/MWNTs powder is treated with a hydrofluoric (HF) aqueous solution and then a hydrochloride (HCl) acid successively, both at room temperature, to dissolve the $Al_2O_3$ and iron particles in the acids. Next, MWNTs are extracted and collected through a filtration process. The collected MWNTs are then washed with distilled water and dried.

Next, purified CNTs are functionalized (oxidized) through an acid treatment process which bonds functional groups to the surface of the CNTs (step 202). Specifically, the CNTs are refluxed for a long period of time (>10 hours) with concentrated nitric acid ($HNO_3$) which has been brought to a boiling condition. Some of the functional groups attached to the CNTs after the acid treatment can include —COOH, >C=O and —OH. These functional groups on the surface of the CNTs facilitate the CNTs to dissolve in a solvent for preparation of a colloidal suspension. More details on how functional groups work will be provided below.

Figure 2B:
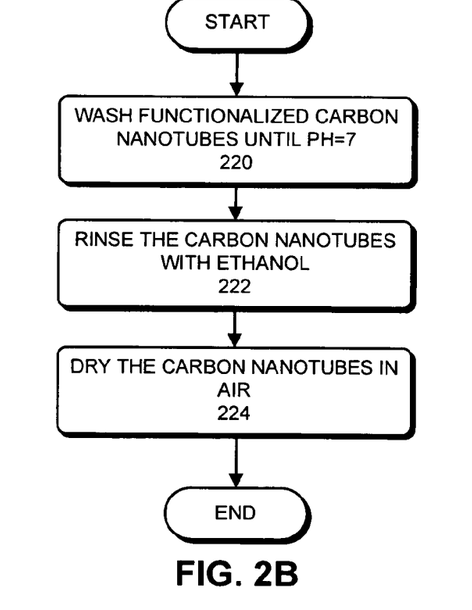
FIG. 2B presents a flowchart illustrating the process of removing residual acid from the functionalized CNTs in accordance with an embodiment of the present invention.

Next, the residual acid is removed from the functionalized CNTs (step 204). Removing the residual acid involves a few additional steps. FIG. 2B presents a flowchart illustrating the process of removing residual acid from the functionalized CNTs in accordance with an embodiment of the present invention. First, the functionalize CNTs are washed with distilled water until the pH value equals 7 (no acid remains) (step 220). Next, the washed CNTs are rinsed with ethanol (step 222). Finally, the CNTs are dried in air at approximately 60° C. (step 224).

Note that, after the acid removal, the surfaces of the CNTs become negatively charged. It is so because some functional groups are acidic surface groups, for example, —COOH. They can become negatively charged through an ionization process by losing an $H^+$. These negative charges are necessary to adequately disperse the CNTs in a solvent in a later step. Also note that, a neutralizer is not preferred for residual acid removal. This is because in addition to reacting with the remaining acid, a neutralizer (such as NaOH, KOH, $NaHCO_3$ or $Na_2CO_3$) can also react with the acidic surface groups, thereby reducing the negative charges on the surfaces of the CNTs.

The fabrication process next allows a predetermined amount of the functionalized CNTs to be dispersed in a solvent (step 206). The solvent can typically include distilled water, ethanol, dimethylformamide (DMF), and mixture of distilled water and methanol. Additionally, certain kinds of organic solvents can also be used. However, DMF and distilled water can serve as better solvents for the functionalized CNTs because of their strong polar properties. Note that, dispersing CNTs in a solvent typically involves sonicating the CNT and solvent mixture to improve the process (step 206).

As mentioned above, the negatively charged CNT surfaces facilitate electrostatic repulsion between individual CNTs. Consequently, such functionalized CNTs can be easily dispersed in the distilled water, the DMF or the mixture of water and methanol with high concentrations (~5 mg/ml). Furthermore, the resulting electrostatic repulsion among CNTs can also lead to a stable suspension. Such stability is needed to form a colloidal suspension. A suspension prepared accordingly can remain stable for many months without aggregated materials precipitating over time.

Note that, generally a higher-concentration of colloidal suspension can be obtained by extending the sonication time of the suspension (a concentrate of 26.7 mg/ml has been obtained in the present invention while using DMF as solvent). Also note that, the concentration of the suspension is much lower (1 mg/ml) when ethanol is used as the solvent.

Finally, a CNT electrode is formed by directly depositing a predetermined volume of the high-concentration CNT colloidal suspension on a metal substrate (current collector) based on the mass of the active materials per unit surface (step 208). In one embodiment of the present invention, a digital pipette is used to dispense exactly 0.1 ml of the MWNTs/DMF suspension onto an 1.2 cm×2 cm metal foil to form a layer of active material. The double-layer electrode is then dried under room temperature or in an oven at 60~70° C. followed by heating in a furnace at around 150° C. to remove remaining solvent in the active material. Note that, no high temperature heat treatment is required after the MWNT film deposition in the present invention.

Note that, because the volume percentage of the CNTs in the suspension is sufficiently high, the CNT layer directly deposited on the current collector forms an interconnecting structure which securely attaches to the current collector. Hence, it does not require a binder (e.g., polyvinylidene fluoride, or polyvinylidene chloride) to hold the CNTs together, which results in a high purity CNT layer. Because of the superb electrical conductivity of high purity CNTs, the supercapacitor electrodes composed of such CNT layers bonded directly to the current collectors effectively reduce both contact resistances between the CNT layer and the current collector and internal resistance in the CNT layer.

Note that, the active materials that can be used to coat the current collector are not limited to CNTs. Other carbon-based active materials can also be used in the above-described process, which can include carbon black, carbon fiber, active carbon, or a mixture of the different active materials. In particular, the active material can be a mixture of the CNTs and another activated carbon material to form composite CNT-based electrodes. Note that when the volume percent of carbon nanotubes in the composite is sufficiently high so that they form an interconnecting structure, the above-described process can be used to fabricate this composite electrode without using a binder.

Properties of an Electrode Fabricated by Direct Deposition

Structural Properties

The CNT films fabricated by direct deposition show high packing-density of CNTs. This is because the electrostatic repulsion between the CNTs in the suspension facilitates a high concentration (up to 26.7 mg/ml) of the CNTs in the suspension. Additionally, the CNT films have shown some local alignment among the nanotubes in the films. Such alignment is described in more details in a separate publication entitled "Carbon Nanotube Thin Films with Ordered Structures," by authors Chunsheng Du, Jeff Yeh and Ning Pan (Journal of Materials Chemistry, 15[5], 548-550, 2005).

Note that, by heating the CNT film coated on the metal substrate in a furnace to introduce a mismatch of thermal expansion between the two, the CNT film can be conveniently peeled off from the metal substrate, indicating that the CNT film can be collected from the metal substrate and used elsewhere.

Electrical Properties

A test supercapacitor is assembled to study the electrical properties of the CNT electrodes. Two electrodes are prepared by depositing 0.1 ml of CNT suspension (concentration: 26.7 mg of MWNTs in 1 ml of DMF) onto two 12 mm×12 mm nickel foils (as current collectors) respectively and followed by drying at room temperature. 6N KOH is used as electrolyte and a glass fiber filter paper immersed in the electrolyte is used as separator between the two electrodes.

The cyclic voltammetry (CV) test is performed with a Potentiostat/Galvanostat (EG&G Princeton Applied Research, Model 263A).

Note that, in addition to using 6N KOH as the electrolyte, the concentration of KOH can be varied. Alternatively, $H_2SO_4$ can be used instead of KOH. Additionally, organic electrolyte obtained by dissolving tetraethylamonium tetrafluoroborate (TEMA) in acetonitrile (AN), γ-butyrolactone (GBL) and propylene carbonate (PC) can also be used as the electrolyte.

Figure 3A:
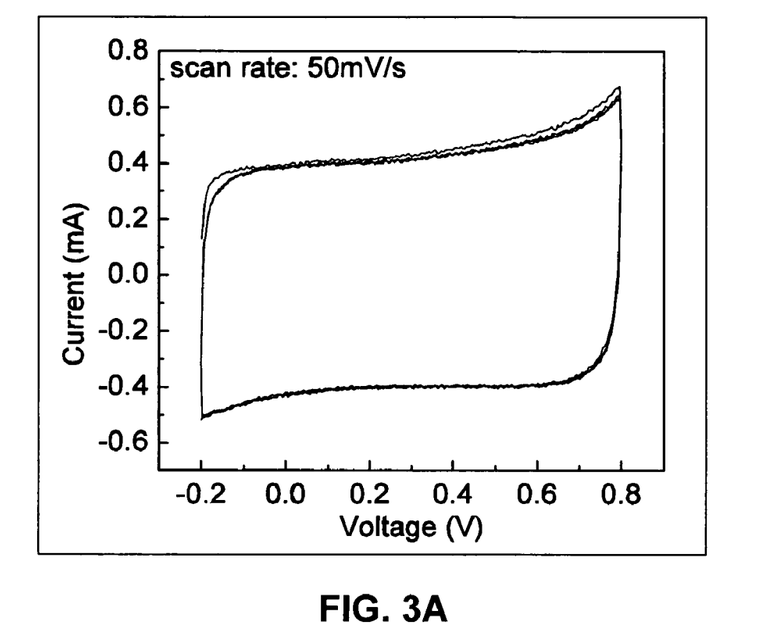
FIG. 3A illustrates an I-V response obtained at a low scan rate of 50 mV/s in accordance with an embodiment of the present invention.
Figure 3B:
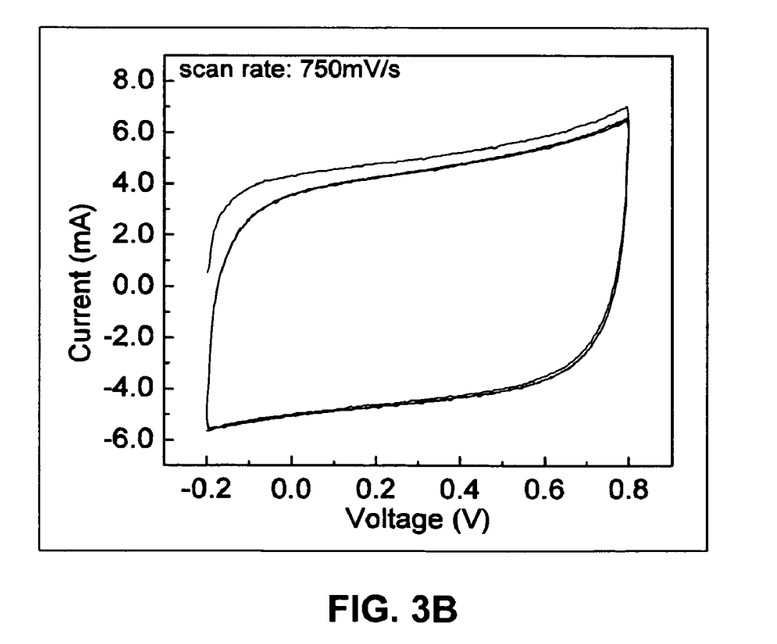
FIG. 3B illustrates an I-V response obtained at a high scan rate of 750 mV/s in accordance with an embodiment of the present invention.

FIG. 3 illustrates the cyclic voltammogram (CV) characteristics at various scan rates of the assembled supercapacitor in accordance with an embodiment of the present invention. It is well-known that the shape of an I(current)–V(voltage) response of a capacitor is rectangular if there are no internal, interfacial and contact resistances in the capacitor (see B. E. Conway, "*Electrochemical Supercapacitor*", Kluwer Academic/Plenum Publisher, 1999). On the other hand, a large resistance can distort the CV loop, thereby resulting in a narrower loop with an oblique shape, especially at high scan rate of the CV measurement.

FIG. 3A illustrates an I-V response obtained at a low scan rate of 50 mV/s in accordance with an embodiment of the present invention. Note that, the CV loop shows a very rapid current response upon a voltage reversal at each end of the CV loop. The nearly rectangular and symmetric I-V response of an ideal capacitive behavior and the vertical rectangular sides indicate that there are negligible internal, interfacial and contact resistances ($\partial I/\partial V \rightarrow \infty$). Note that, the internal, interfacial and contact resistances can be lumped into an equivalent series resistance (ESR) for the supercapacitor.

FIG. 3B illustrates an I-V response obtained at a high scan rate of 750 mV/s in accordance with an embodiment of the present invention. Note that the CV loop is still close to an ideal rectangular shape, even at this considerably high scan rate. Clearly, the result indicates an extremely low ESR of the CNT electrodes, which can be attributed to the construction of the electrodes in which the high packing-density CNT films are formed on the current collector without using a binder.

Using the above-described test supercapacitors, a maximum power density of 30 kW/kg has been obtained.

Fabricating CNT Electrodes by EPD

Figure 4:
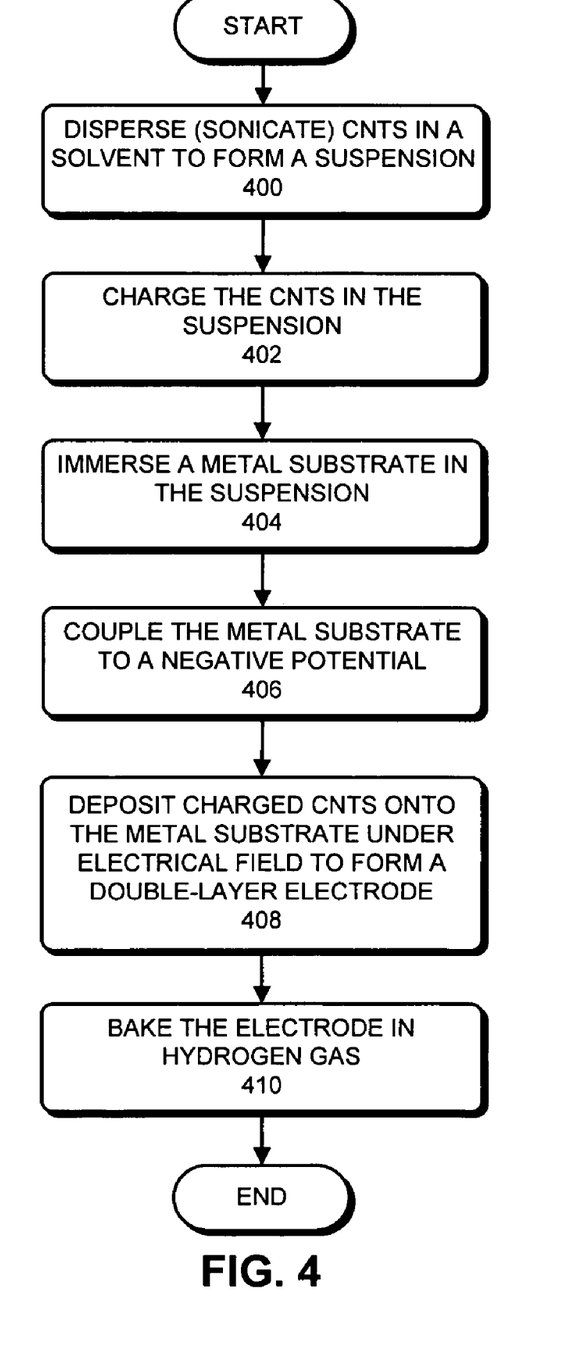
FIG. 4 presents a flowchart illustrating the process of fabricating a CNT electrode by electrophoretic deposition (EPD) in accordance with an embodiment of the present invention.

Alternative to the above-described direct deposition process, electrophoretic deposition (EPD) technique can also deposit CNTs dispersed in a colloidal suspension onto a current collector to form a double-layer electrode. FIG. 4 presents a flowchart illustrating the process of fabricating a CNT electrode by EPD in accordance with an embodiment of the present invention. Note that, procedures before dispersion of the CNTs in a solvent are the same as described in step 200 to step 204 in FIG. 2, hence are not repeated here.

The remaining of the fabrication process starts with dispersing the CNTs in a solvent to form a suspension (step 400). In one embodiment of the present invention, the solvent is ethanol instead of distilled water or DMF as preferred in the direct deposition process. Ethanol is preferred because it remains chemically stable under an applied electrical field (such a field is established during EPD process). Furthermore, a high-concentration suspension is not required for EPD process. Note that sonication can still facilitate the dispersion process.

Next, the CNTs are charged in the suspension (step 402) in preparation for EPD. In one embodiment of the present invention, charging the CNTs in the suspension involves adding $Mg(NO_3)_2 \cdot 6H_2O$ into the suspension as electrolyte. As a result, the surfaces of the CNTs are positively charges with $Mg^{2+}$. Note that, even thought the CNT surface has been previously negatively charged during the functionalizing process, the amount of negative charges is much smaller in comparison to the amount of positive charges. As a result, the overall CNT appears positively charged.

Next, a metal substrate is immersed in the CNT suspension (step 404) and subsequently coupled to a voltage source. Specifically, the metal substrate to be coated is coupled to a negative terminal of the voltage source to form an EPD cathode (step 406), which can attract positively charged CNTs. Additionally, a second metal substrate is immersed in the CNT suspension opposing the first metal substrate, wherein the second substrate is coupled to a positive terminal of the voltage source to form an EPD anode. Consequently, a uniform electrical field is established between the two metal substrates.

Under the applied electrical field, the positively charged CNTs in the suspension move towards the EPD cathode (the first metal substrate) and firmly latch onto the cathode. As a result, a uniform layer of the CNTs can be gradually deposited onto the metal substrate to form a thin-film electrode (step 408). Note that, similar to the direct deposition process, no binder is needed in the EPD electrode, which also effectively reduces contact resistance between the CNTs and the metal substrate. On the other hand, in comparison with the direct deposition process, EPD process produces a more uniform but usually thinner layer of active material. The thickness is typically around a few micrometers. A thicker layer may be obtained from a prolonged deposition time. Note that, the second metal substrate will not be coated because it repels positively charges CNTs.

Note that the metal substrates can be placed horizontally, vertically, or at an arbitrary angle in the CNT suspension. In one embodiment of the present invention, the horizontal placement is preferred because it facilitates obtaining a uniform coating over the entire metal substrate. Specifically, such an arrangement allows the charged CNTs to move upward towards the negatively charge metal substrate under the applied electric field. Such upward movement can effectively separate the sediments in the suspension from the CNTs by working against gravity force.

After deposition, the EPD cathode is removed from the suspension and baked to improve CNT layer adhesion (step 410). Specifically, the layer of CNTs on the metal substrate is heated in a furnace at approximately 500° C. for 30 minutes in a reducing gas environment. In one embodiment of the present invention, the gas is hydrogen ($H_2$).

Note that, the above-described EPD deposition process can be readily applied to other carbon-based active materials besides CNTs, which can include carbon black, carbon fiber, active carbon, or a mixture of the different active materials.

Figure 5:
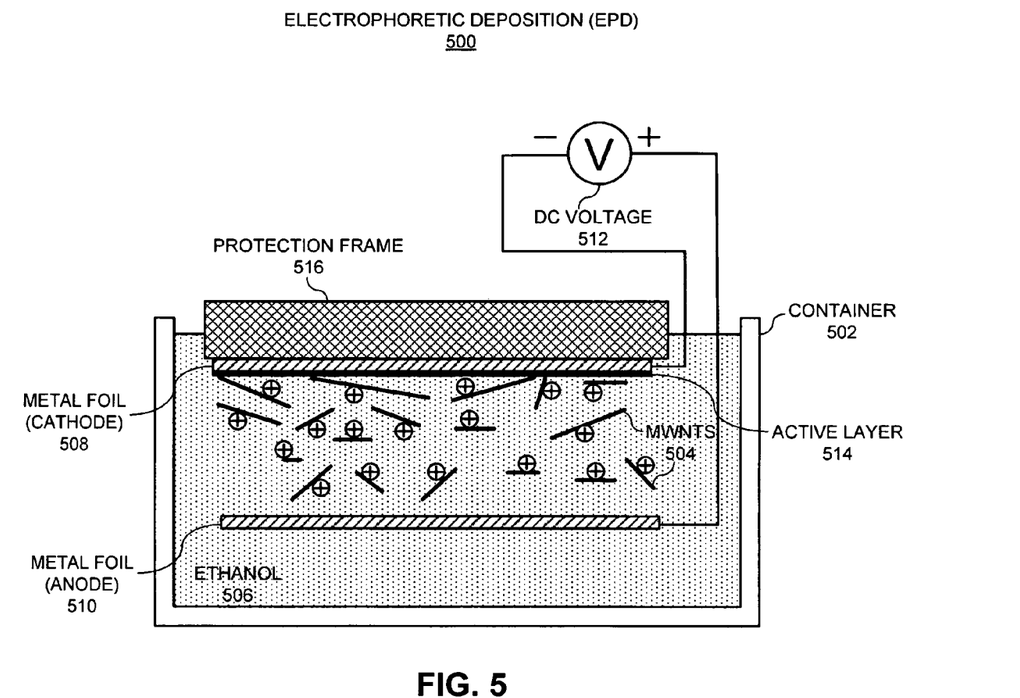
FIG. 5 illustrates a typical EPD setup for fabricating a CNT electrode in accordance with an embodiment of the present invention.

FIG. 5 illustrates a typically EPD setup 500 for fabricating a CNT electrode in accordance with an embodiment of the present invention. A container 502 contains a suspension of positively charged MWNTs 504 which are dispersed in ethanol 506. Two pieces of nickel foils 508 and 510 are used as the EPD electrodes, which are immersed in the suspension horizontally at a certain distance and parallel to each other.

A DC voltage 512 is applied on the EPD electrodes, such that the upper metal foil 508 is coupled to the negative terminal of voltage 512 as the cathode, whereas the lower metal foil 510 is coupled to the positive terminal as the anode. The positively charged MWNTs are attracted upward towards the cathode and deposit onto metal foil (cathode) 508 to form a densely but uniformly packed active layer 514.

Note that cathode 508 is affixed to a protection frame 516 which holds metal foil 508 in place and also prevents the upper side of metal foil 508 from being coated.

Note that the metal substrate can generally include any metal that provides good electrical conductivity, such as nickel, copper, aluminum, gold, platinum and other electrode metals that are compatible with the cell chemistry. Note that certain restrictions exist, for example, if KOH is used as the electrolyte, then aluminum can not be used as the metal substrate, since it will react with the electrolyte.

Properties of an Electrode Fabricated by EPD

Structural Properties

A CNT thin film electrode fabricated by EPD typically has a porous structure in the thin film because of the open spaces between the entangled nanotubes. Pores in the thin film may be classified into micropores and mesopores depending on a pore dimension. Micropores <2 nm are not very noticeable in the EPD electrodes, whereas mesopores between 2-50 nm are more dominant. The open porous structure facilitates easy access of the solvated ions to the electrode/electrolyte interface and significantly increases the accessible surface areas of the active material, thereby improving the charge storage capacity of the supercapacitor. Note that such an open porous structure with a high accessible surface area is generally unobtainable with other carbon-based materials.

Electrical Properties

A test supercapacitor is assembled to study the electrical properties of the CNT electrodes. Two nickel foils (current collectors) and CNT thin films deposited onto the nickel foils by EPD form the electrodes. 6N KOH is used as the electrolyte and a glass fiber filter paper immersed in the electrolyte is used as a separator between the two electrodes. Next, the cyclic voltammetry (CV) test is performed with the Potentiostat/Galvanostat (EG&G Princeton Applied Research, Model 263A).

Note that, other than using 6N KOH as the electrolyte, the concentration of KOH can be varied. Alternatively, $H_2SO_4$ can be used instead of KOH. Additionally, organic electrolyte obtained by dissolving tetraethylamonium tetrafluoroborate (TEMA) in acetonitrile (AN), γ-butyrolactone (GBL) and propylene carbonate (PC) can also be used as the electrolyte.

Figure 6A:
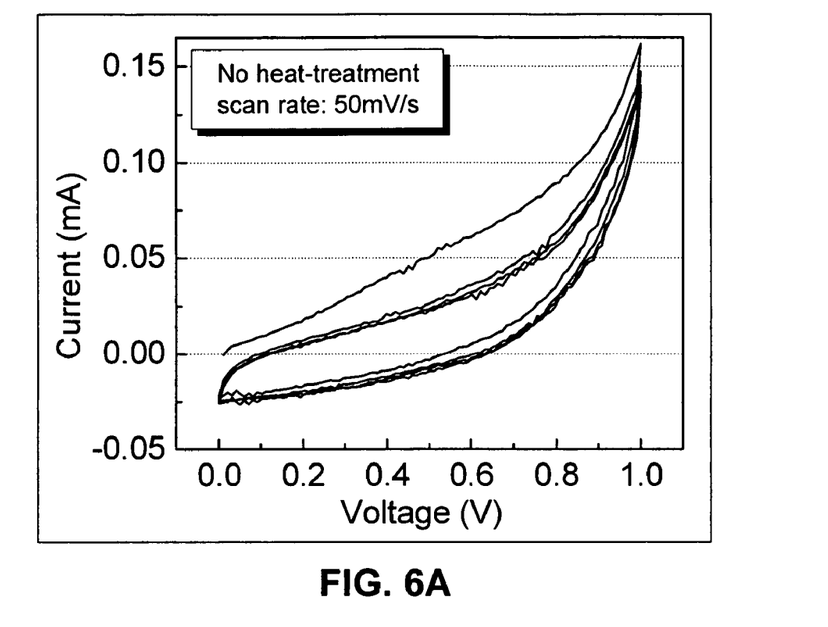
FIG. 6A illustrates an I-V response obtained at a scan rate of 50 mV/s for a supercapacitor comprising EPD electrodes without heat-treatment in accordance with an embodiment of the present invention.

FIG. 6A illustrates an I-V response obtained at a scan rate of 50 mV/s for a supercapacitor comprising EPD electrodes without heat-treatment (i.e., without step 410) in accordance with an embodiment of the present invention.

Without the heat treatment to the CNT electrode formed by the EPD process, the measured film resistance is very high (in kΩ range), which subsequently leads to a large ESR of the supercapacitor. Due to this large ESR, the CV characteristics of the supercapacitor show narrow loop with an oblique angle, indicating a poor performance.

Figure 6B:
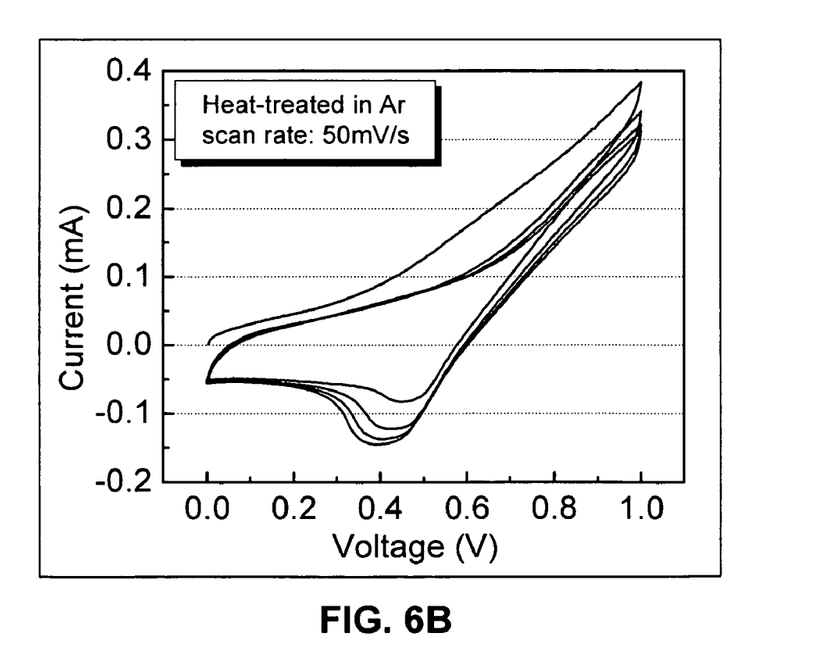
FIG. 6B illustrates an I-V response obtained at a scan rate of 50 mV/s for a supercapacitor comprising EPD electrodes heat-treated in Ar in accordance with an embodiment of the present invention.

FIG. 6B illustrates an I-V response obtained at a scan rate of 50 mV/s for a supercapacitor comprising EPD electrodes heat-treated in Argon (Ar) in accordance with an embodiment of the present invention. FIG. 6B shows the I-V response of the supercapacitor using argon-treated electrodes is of a similar poor shape as those in FIG. 6A, indicating no noticeable change of resistance of the EPD electrodes.

Figure 7A:
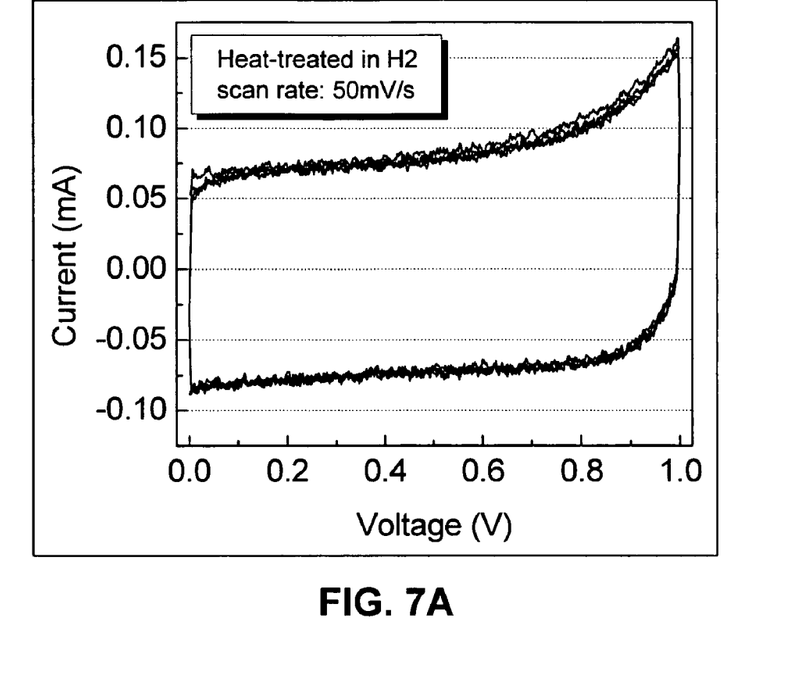
FIG. 7A illustrates an I-V response obtained at a low scan rate of 50 mV/s for a supercapacitor comprising EPD electrodes heat-treated in $H_2$ in accordance with an embodiment of the present invention.
Figure 7B:
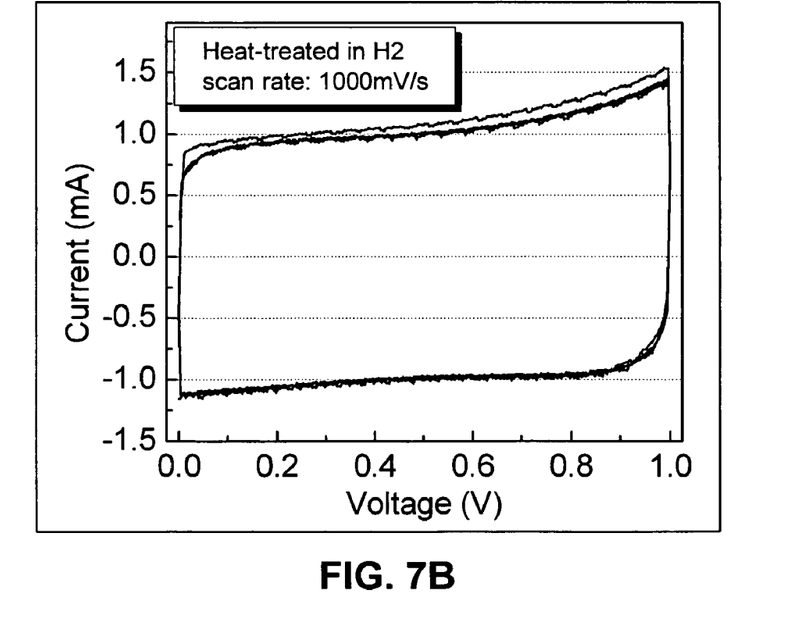
FIG. 7B illustrates an I-V response obtained at a high scan rate of 1000 mV/s for a supercapacitor comprising EPD electrodes heat-treated in $H_2$ in accordance with an embodiment of the present invention.

FIG. 7 illustrates the CV characteristics at various scan rates of a supercapacitor comprising EPD electrodes heat-treated in hydrogen ($H_2$) in accordance with an embodiment of the present invention.

FIGS. 7A and 7B illustrate I-V responses obtained at a low scan rate of 50 mV/s and a high scan rate of 1000 mV/s respectively in accordance with an embodiment of the present invention. Note that, after baking the EPD electrodes in $H_2$ at 500° C. for about 30 minutes, the resistance of the CNT films and hence the ESR of the supercapacitor decreases significantly. The I-V responses at different scan rates are almost identical with respect to the zero-current line and show a very rapid current response upon a voltage reversal at each end of the CV loop. In particular, at the very high scan rate of 1000 mV/s, the nearly rectangular and symmetric I-V response of an ideal capacitive behavior and the vertical rectangular sides indicate that there is negligible ESR and a very fast diffusion of electrolyte in the supercapacitor.

Using the above-described test supercapacitors, a maximum power density of 20 kW/kg has been obtained.

An Electrode Combining EPD and Direct Deposition

A thick layer of active material is advantageous for increasing the output current of supercapacitors by increasing their charge storage capacity. However, the EPD process is typically only suitable for producing a layer of active material of a few micrometers thick. In one embodiment of the present invention, the EPD process can be used to pre-coat a current collector to form a thin film CNT interface for the electrode. Next, a thicker CNT film obtained from the direct deposition process can be laminated onto the thin EPD CNT interface to form a thicker double-layer electrode. Note that, both the EPD thin film and the directly deposited film have high packing-density and neither requires a binder to fabricate.

An Electrode Comprising a CNT Layer by EPD and a CNT Mat

In one embodiment of the present invention, a thicker electrode can be produced by combining an EPD CNT electrode with a CNT "mat" or "cake". Generally, it is time-consuming to prepare thick mats or cakes using an EPD process or even direct deposition. However, a filtration process can be used to prepare relatively thick CNT mats. Note that, making CNT mats through filtration does not require treating CNTs to obtain a stable suspension.

For comparison purposes, two types of current collectors are prepared: the first type is the nickel foils type without an active material coating, and the second type is the nickel foils pre-coated with a CNT thin film by the EPD process. Additionally, CNT mats are prepared through filtration to serve as the active material. In the first type of electrodes, the CNT mats are laid onto the nickel foils to form dual-layer electrodes of the supercapacitors. Whereas in the second type of electrodes, the CNT mats are laid onto the pre-coated nickel foils to form dual-layer electrodes of the supercapacitors.

Figure 8A:
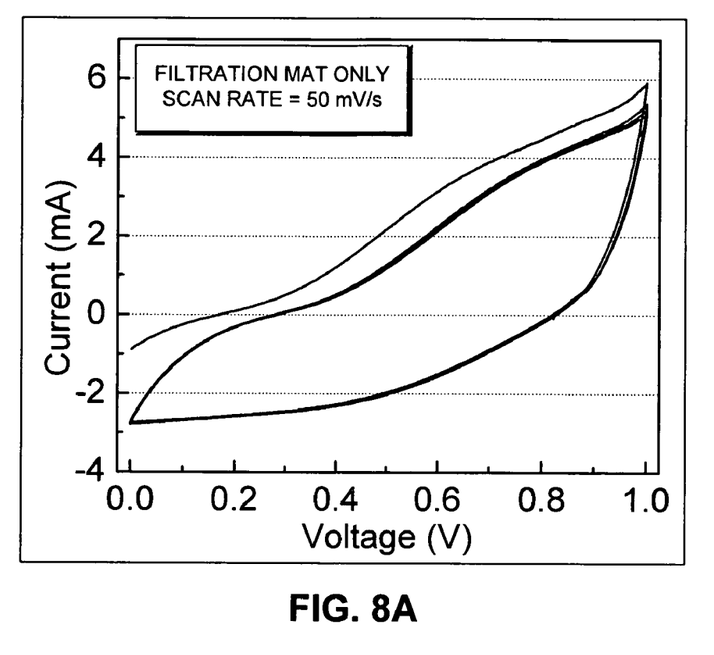
FIG. 8A illustrates the I-V response of a supercapacitor comprising electrodes using nickel foils without an active material coating as current collectors in accordance with an embodiment of the present invention.

FIG. 8A illustrates the I-V response of a supercapacitor comprising electrodes of the first type in accordance with an embodiment of the present invention. The figure shows that the CV loop is severely distorted at a scan rate of 50 mV/s, which resulted from a high contact resistance between the CNT mats and the current collectors.

Figure 8B:
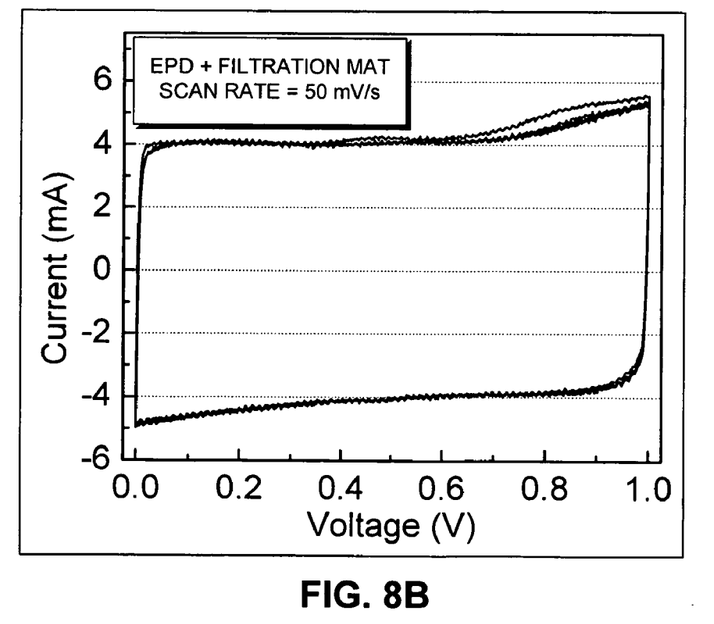
FIG. 8B illustrates the I-V response of a supercapacitor comprising electrodes using nickel foils pre-coated with a CNT thin-film by EPD process as current collectors in accordance with an embodiment of the present invention.

In contrast, FIG. 8B illustrates the I-V response of a supercapacitor comprising electrodes of the second type in accordance with an embodiment of the present invention. The figure shows a nearly rectangular CV loop at the same scan rate of 50 mV/s, indicating a much lower ESR in comparison to that of FIG. 8A. Note that, the CNT mats used in both tests are identical. Hence, pre-coating the current collector with a thin film layer by the EPD process is beneficial to lower the interfacial resistance of a double-layer electrode.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A process for fabricating an electrode for a capacitor using carbon nanotubes (CNTs), wherein the electrode comprises a metal substrate and a layer of active material coated onto the metal substrate, the process comprising:
dispersing CNTs in a solvent to form a suspension, wherein the CNTs are precharged prior to the dispersion to facilitate dispersing in the solvent through electrostatic repulsion of the CNTs;
charging the CNTs in the suspension;
immersing the metal substrate in the suspension; and
depositing the CNTs onto the metal substrate using electrophoretic deposition (EPD) to form the layer of active material on the metal substrate;
whereby the layer of active material is formed on the metal substrate without using a binder, which effectively reduces contact resistance between the active material and the metal substrate.

2. The process of claim 1, wherein the CNTs include at least one of the following:
single-walled CNTs (SWNTs); and
multi-walled CNTs (MWNTs).

3. The process of claim 1, further comprising baking the layer of active material on the metal substrate in a hydrogen ($H_2$) environment after depositing the CNTs onto the metal substrate using the EPD.

4. The process of claim 1, wherein dispersing the CNTs in the solvent involves sonicating the solvent and the CNT mixture for a predetermined time period.

5. The process of claim 1, wherein charging the CNTs in the suspension involves adding $Mg(NO_3)_2 \cdot 6H_2O$ into the suspension as electrolyte, which positively charges the CNTs.

6. The process of claim 1, further comprising coupling the metal substrate to a negative terminal of a constant voltage source.

7. The process of claim 1, wherein the metal substrate placed in the suspension:
horizontally;
vertically; or
at an arbitrary angle.

8. The process of claim 1, wherein the metal substrate includes any metal that provides electrical conductivity, such as:
nickel;
copper;
aluminum;
gold; or
platinum.

9. The process of claim 1, wherein the solvent is ethanol.

10. The process of claim 1, wherein the active material includes:
carbon nanotube;
carbon black;
carbon fiber;
active carbon; or
a mixture of any of the above.

11. A process for fabricating a layer of active material with a high packing-density, wherein the layer of active material is used to form an electrode, wherein the electrode comprises a metal substrate and the layer of active material coated onto the metal substrate, the process comprising:
obtaining functionalized active material;
dispersing the functionalized active material in a solvent to form a high-concentration colloidal suspension of at least 1 mg/ml of the active material; and
directly depositing the suspension of the active material onto the metal substrate to form the layer of active material;
whereby the layer of active material is formed on the metal substrate with high packing-density without using a binder, which effectively reduces contact resistance between the active material and the metal substrate.

12. The process of claim 11, wherein obtaining the functionalized active material involves:
treating the active material in a concentrated acid to bond a plurality of functional groups onto the active material; and
removing the concentrated acid from the treated active material.

13. The process of claim 12, wherein removing the concentrated acid from the treated active material involves:
washing the active material with distilled water;
rinsing the washed active material with ethanol; and
drying the active material at a predetermined temperature.

14. The process of claim 11, wherein the solvent is dimethylformamide (DMF) or distilled water.

15. The process of claim 11, wherein dispersing the functionalized active material in the solvent involves sonicating the solvent and the active material mixture for a predetermined time period.

16. The process of claim 11, wherein the active material includes:
carbon nanotube;
carbon black;
carbon fiber;
active carbon; or
a mixture of any of the above.

17. The process of claim 12, wherein the functional groups include at least one of the following:
—COGH;
>C=O; and
—OH.

18. The process of claim 11, further comprising oxidizing the active material prior to dispersing the active material in the solvent.

19. A capacitor for storing electrical energy, comprising:
at least two opposing electrodes, wherein at least one of the electrodes comprises:
a metal substrate; and
a layer of active material coated onto the metal substrate, wherein
the active material is carbon nanotube (CNT);
an electrolyte disposed between the electrodes; and
a separator immersed in the electrolyte between the electrodes;

wherein the active material is deposited onto the metal substrate by electrophoretic deposition (EPD) without using a binder, which effectively reduces contact resistance between the active material and the metal substrate; and wherein during the deposition of the active material onto the metal substrate using the EPD, the metal substrate is placed horizontally in a suspension of the active material, and the active material moves upward toward the metal substrate.

20. The capacitor of claim 19, wherein the CNT includes at least one of the following:
  single-walled CNT (SWNT); and
  multi-walled CNT (MWNT).

21. The capacitor of claim 19, wherein the metal substrate includes any metal that provides electrical conductivity, such as:
  nickel;
  copper;
  aluminum;
  gold; or
  platinum.

22. The capacitor of claim 19, wherein the active material includes:
  carbon nanotube;
  carbon black;
  carbon fiber;
  active carbon; or
  a mixture of any of the above.

23. An electrode for an energy storage device, comprising:
  a metal substrate; and
  a layer of active material coated onto the metal substrate, wherein the active material is carbon nanotube (CNT);
  wherein the active material is deposited onto the metal substrate by electrophoretic deposition (EPD) without using a binder, which effectively reduces contact resistance between the active material and the metal substrate; and
  wherein during the deposition of the active material onto the metal substrate using the EPD, the metal substrate is placed horizontally in a suspension of the active material, and the active material moves upward toward the metal substrate.

24. The electrode of claim 23, wherein the energy storage device includes:
  a capacitor; or
  a battery.

25. A process for fabricating an electrode for a capacitor using carbon nanotubes (CNTs), wherein the electrode comprises a metal substrate and a layer of active material coated onto the metal substrate, the process comprising:
  dispersing CNTs in a solvent to form a suspension;
  charging the CNTs in the suspension;
  immersing the metal substrate in the suspension; and
  depositing the CNTs onto the metal substrate using electrophoretic deposition (EPD) to form the layer of active material on the metal substrate,
    wherein during deposition of the CNTs onto the metal substrate using the EPD, the charged CNTs move upward towards the metal substrate under an applied electric field; and
    wherein the metal substrate is placed horizontally in the suspension,
  whereby the layer of active material is formed on the metal substrate without using a binder, which effectively reduces contact resistance between the active material and the metal substrate.

* * * * *